United States Patent
Habuka et al.

(10) Patent No.: US 12,459,823 B2
(45) Date of Patent: Nov. 4, 2025

(54) VANADIUM SILICON CARBIDE FILM, VANADIUM SILICON CARBIDE FILM COATED MEMBER, AND MANUFACTURING METHOD OF VANADIUM SILICON CARBIDE FILM COATED MEMBER

(71) Applicant: DOWA THERMOTECH CO., LTD., Tokyo (JP)

(72) Inventors: Satoru Habuka, Aichi (JP); Hiroyuki Matsuoka, Akita (JP)

(73) Assignee: DOWA THERMOTECH CO., LTD., Tokyo (JP)

( * ) Notice: Subject to any disclaimer, the term of this patent is extended or adjusted under 35 U.S.C. 154(b) by 834 days.

(21) Appl. No.: 17/763,011

(22) PCT Filed: Sep. 29, 2020

(86) PCT No.: PCT/JP2020/036806
§ 371 (c)(1),
(2) Date: Mar. 23, 2022

(87) PCT Pub. No.: WO2021/065865
PCT Pub. Date: Apr. 8, 2021

(65) Prior Publication Data
US 2022/0411271 A1 Dec. 29, 2022

(30) Foreign Application Priority Data
Sep. 30, 2019 (JP) .................. 2019-180086

(51) Int. Cl.
| C01B 32/907 | (2017.01) |
| C23C 16/32 | (2006.01) |
| C23C 16/515 | (2006.01) |

(52) U.S. Cl.
CPC .......... *C01B 32/907* (2017.08); *C23C 16/325* (2013.01); *C23C 16/515* (2013.01); *C01P 2002/72* (2013.01); *C01P 2006/80* (2013.01)

(58) Field of Classification Search
CPC ... C01B 32/907; C23C 16/125; C23C 16/515; C01P 2002/72; C01P 2006/80
See application file for complete search history.

(56) References Cited

U.S. PATENT DOCUMENTS 5,562,952 A * 10/1996 Nakahigashi ......... C23C 16/405
427/322
2017/0323803 A1 * 11/2017 van Schravendijk ....................
H01J 37/32009

FOREIGN PATENT DOCUMENTS

| CN | 105803393 A * | 7/2016 |
| JP | 07-300649 | 11/1995 |

(Continued)

OTHER PUBLICATIONS

Karhu, Robin, et al. "CVD growth and properties of on-axis vanadium doped semi-insulating 4H—SiC epilayers." Journal of Applied Physics 125.4 (2019).*

(Continued)

*Primary Examiner* — Richard M Rump
(74) *Attorney, Agent, or Firm* — GREENBLUM & BERNSTEIN, P.L.C.

(57) ABSTRACT

A vanadium silicon carbide film contains vanadium, silicon, and carbon, in which the total of a vanadium element concentration, a silicon element concentration, and a carbon element concentration in the film is 90 at % or more.

9 Claims, 3 Drawing Sheets

(56) References Cited

FOREIGN PATENT DOCUMENTS

JP         10-225824         8/1998
JP         2019-035108         3/2019

OTHER PUBLICATIONS

Fukai, T., M. Naka, and J. C. Schuster. "Interfacial microstructure and reaction phases of solid state bonded at SiC/V joints." Journal of Materials Synthesis and Processing 6 (1998): 387-392.*
Zhigalina, O. M., et al. "Structure of diamond-like silicon-carbon films alloyed by vanadium." Crystallography Reports 63 (2018): 796-801.*
Seong, Han-Kyu, et al. "Magnetic properties of vanadium-doped silicon carbide nanowires." Metals and Materials International 15.1 (2009): 107-111.*
International Search Report issued in International Bureau of WIPO Patent Application No. PCT/JP2020/036806, dated Dec. 8, 2020.
Written Opinion issued in International Bureau of WIPO Patent Application No. PCT/JP2020/036806, dated Dec. 8, 2020, along with an English translation thereof.

* cited by examiner

VANADIUM SILICON CARBIDE FILM, VANADIUM SILICON CARBIDE FILM COATED MEMBER, AND MANUFACTURING METHOD OF VANADIUM SILICON CARBIDE FILM COATED MEMBER

TECHNICAL FIELD

The present invention relates to a vanadium silicon carbide film, a vanadium silicon carbide film coated member, and a manufacturing method of a vanadium silicon carbide film coated member.

BACKGROUND ART

Conventionally, on the surfaces of metal molds used for press working and forging, there is formed a vanadium-based film rich in lubricity in order to prevent wear of the metal mold surface and scratching of a material to be molded caused by contact friction during processing of the material to be molded. As such a vanadium-based film, Patent Document 1 discloses that a plasma chemical vapor deposition method is used to coat the surface of a steel product with a vanadium silicocarbonitride film containing vanadium, silicon, carbon, and nitrogen.

PRIOR ART DOCUMENT

Patent Document

Patent Document 1: Japanese Laid-open Patent Publication No. 2019-035108

SUMMARY OF THE INVENTION

Problems to be Solved by the Invention

In recent years, from the viewpoint of environmental protection, there has been a need to reduce the amount of lubricating oil to be used in the pressing work and forging of materials to be molded using metal molds, for example, and to work them in what is called a semi-dry or dry condition without using a lubricating oil. In order to enable the pressing work and forging in such a condition, it is desired to form a film having a lower friction coefficient on the metal mold surface. However, although the vanadium silicocarbonitride film described in Patent Document 1 has excellent abrasion resistance, there is still room for the improvement in terms of friction coefficient.

The present invention has been made in consideration of the above-described circumstances, and an object thereof is to provide a vanadium-based film having a low friction coefficient.

Means for Solving the Problems

The present inventors found out that in the vanadium-based film containing vanadium (V), silicon (Si), and carbon (C), the friction coefficient of the vanadium-based film becomes lower when the total of a vanadium element concentration [at %], a silicon element concentration [at %], and a carbon element concentration [at %] in the film satisfies a predetermined numerical range, and then completed the present invention.

One aspect of the present invention that solves the above-described problems is a vanadium silicon carbide film, the vanadium silicon carbide film containing vanadium, silicon, and carbon, in which the total of a vanadium element concentration, a silicon element concentration, and a carbon element concentration in the film is 90 at % or more.

One aspect of the present invention according to another viewpoint is a vanadium silicon carbide film coated member, the vanadium silicon carbide film coated member including: a base material; and the above-described vanadium silicon carbide film formed on the aforementioned base material.

One aspect of the present invention according to still another viewpoint is a manufacturing method of the above-described vanadium silicon carbide film coated member, the method including: supplying a vanadium chloride gas, a silicon source gas, a carbon source gas, and a hydrogen gas into a changer and forming a vanadium silicon carbide film on a base material by using a plasma chemical vapor deposition method to manufacture the aforementioned vanadium silicon carbide film coated member.

Effect of the Invention

According to the present invention, it is possible to provide a vanadium silicon carbide film having a low friction coefficient.

EMBODIMENTS FOR CARRYING OUT INVENTION

Figure 1:
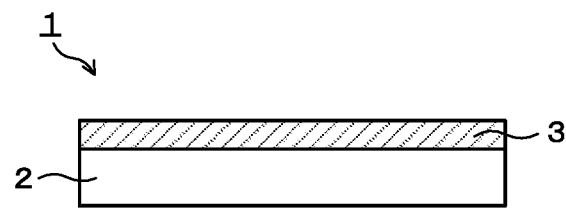
FIG. 1 is a view illustrating a schematic configuration of a vanadium silicon carbide film coated member according to one embodiment of the present invention.

Hereinafter, an embodiment of the present invention will be explained referring to the drawings. Note that in this description and the drawings, the same codes are given to components having substantially the same functional configurations, to thus omit duplicated explanation.

(Vanadium Silicon Carbide Film Coated Member)

FIG. 1 is a view illustrating a schematic configuration of a vanadium silicon carbide film coated member 1 in this embodiment. The vanadium silicon carbide film coated member 1 in this embodiment is formed of a base material 2 and a vanadium silicon carbide film 3 formed on the base material 2. The vanadium silicon carbide film coated member 1 is for the use of various tools and parts, such as, for example, cutting tools, gear cutting tools, forging tools, and automotive parts, in addition to metal molds used for press working and forging.

The type of base material 2 is not limited in particular, and a suitable material is used according to the application of the vanadium silicon carbide film coated member 1. For example, as the material of the base material 2 of a metal mold, a tool, or the like, what is called a cold tool steel such as SKD11, DC53, or SKH51, and various steel materials such as cold mold steel (cold die steel) or high speed tool steel (high speed steel) can be used.

(Vanadium Silicon Carbide Film)

The vanadium silicon carbide film 3 in this embodiment is a film containing vanadium (V), silicon (Si), and carbon (C), with the total of a vanadium element concentration, a silicon element concentration, and a carbon element concentration being 90 at % or more. As explained in examples to be described later, the vanadium silicon carbide film 3 with the total of the vanadium element concentration, the silicon element concentration, and the carbon element concentration being 90 at % or more is a film having a low friction coefficient with another member that comes into contact therewith (for example, a material to be molded in the case of the vanadium silicon carbide film coated member 1 being a metal mold). "Another member that comes into contact therewith" is not limited in particular, but, examples thereof include steel materials in general, an alloy steel, a carbon steel, an aluminum alloy material, a magnesium alloy material, a titanium alloy material, and so on. The reason why the friction coefficient of the vanadium silicon carbide film 3 with another member that comes into contact therewith becomes lower is conceivably because the vanadium silicon carbide film 3 contains a large amount of amorphous silicon carbide (SiC), and thereby an oxide coating film is formed on the surface of the film when the vanadium silicon carbide film 3 slides with another member, resulting in exhibition of good sliding characteristics.

The total of the vanadium element concentration, the silicon element concentration, and the carbon element concentration in the vanadium silicon carbide film 3 is more preferably 93 at % or more. Moreover, it is further preferably 95 at % or more. Further, the vanadium silicon carbide film 3 may contain 10 at % or less of a nonmetallic element. Examples of the nonmetallic element include fluorine, argon, chlorine, and hydrogen contained in a raw material gas and an argon gas supplied in a vanadium silicon carbide film forming step, oxygen and nitrogen contained in the gas remaining in a chamber of a film forming apparatus where the vanadium silicon carbide film is formed, and so on. The nonmetallic element contained in the vanadium silicon carbide film 3 is more preferably 7 at % or less. Moreover, it is further preferably 5 at % or less. Incidentally, the vanadium element concentration, the silicon element concentration, and the carbon element concentration in the vanadium silicon carbide film 3 can be measured by a chemical composition analysis using EPMA. Further, the X-ray diffraction spectrum of the vanadium silicon carbide film 3 has peaks of vanadium carbide, and does not have peaks of vanadium silicon carbide, silicon carbide, or vanadium silicide observed. The vanadium silicon carbide film 3 may be an amorphous film, and does not need to have the peak of vanadium carbide observed, for example.

In the vanadium silicon carbide film 3, the vanadium element concentration is preferably 8 to 30 at %, the silicon element concentration is preferably 8 to 30 at %, and the carbon element concentration is preferably 40 to 80 at %. In the case of the vanadium element concentration being 8 to 30 at %, the effect of improving lubricity derived from vanadium is obtained easily, and the friction coefficient between the vanadium silicon carbide film 3 and another member is likely to be lower. In the case of the silicon element concentration being 8 to 30 at %, amorphous silicon carbide (SiC) is formed easily in the vanadium silicon carbide film 3, and when the vanadium silicon carbide film 3 slides with another member, an oxide coating film is formed on the surface of the film and the friction coefficient between the vanadium silicon carbide film 3 and another member is likely to be lower. In the case of the carbon element concentration being 40 to 80 at %, amorphous silicon carbide (SiC) and amorphous carbon are formed easily in the vanadium silicon carbide film 3, and the friction coefficient between the vanadium silicon carbide film 3 and another member is likely to be lower. Incidentally, the vanadium element concentration is more preferably 9 at % or more. Further, the vanadium element concentration is more preferably 25 at % or less. The silicon element concentration is more preferably 9 at % or more. Further, the silicon element concentration is more preferably 25 at % or less. The carbon element concentration is more preferably 50 at % or more. Further, the carbon element concentration is more preferably 80 at % or less.

From the viewpoint of further reducing the friction coefficient, the vanadium element concentration, the silicon element concentration, and the carbon element concentration in the vanadium silicon carbide film 3 preferably satisfy (1) Expression below.

(carbon element concentration−vanadium element concentration−silicon element concentration) ≥10.0 at %      (1)

It is considered that by satisfying (1) Expression above, the friction coefficient of the vanadium silicon carbide film 3 will be lower because the vanadium silicon carbide film 3 contains more amorphous carbon, which is known to have a low friction coefficient. From the viewpoint of further reducing the friction coefficient, the vanadium element concentration, the silicon element concentration, and the carbon element concentration in the vanadium silicon carbide film 3 more preferably satisfy (2) Expression below.

(carbon element concentration−vanadium element concentration−silicon element concentration) ≥14.0 at %      (2)

The hardness of the vanadium silicon carbide film 3 is set appropriately according to the application, but from the viewpoint of obtaining a film with excellent durability, the hardness is preferably 2700 HV or more. Incidentally, the hardness of the film in this description is a Vickers hardness. The measurement of hardness is performed using a nanoindentation method. Specifically, a Berkovich-type diamond indenter is pushed into a test piece with a maximum indentation load set to 3 mN to measure an indentation depth continuously, and the Martens hardness obtained from measurement data of the indentation depth is converted to the Vickers hardness, and thereby the hardness of the film is measured. The thickness of the vanadium silicon carbide film 3 is set according to the application, but in the case where the vanadium silicon carbide film 3 is formed on a base material of a metal mold, for example, the film thickness is preferably 0.5 to 4 μm. Further, the vanadium silicon carbide film coated member 1 may include an intermediate layer such as a vanadium film or a vanadium carbide film between the base material 2 and the vanadium silicon carbide film 3 as necessary.

Next, there is explained a manufacturing method of the vanadium silicon carbide film coated member 1.

Figure 2:
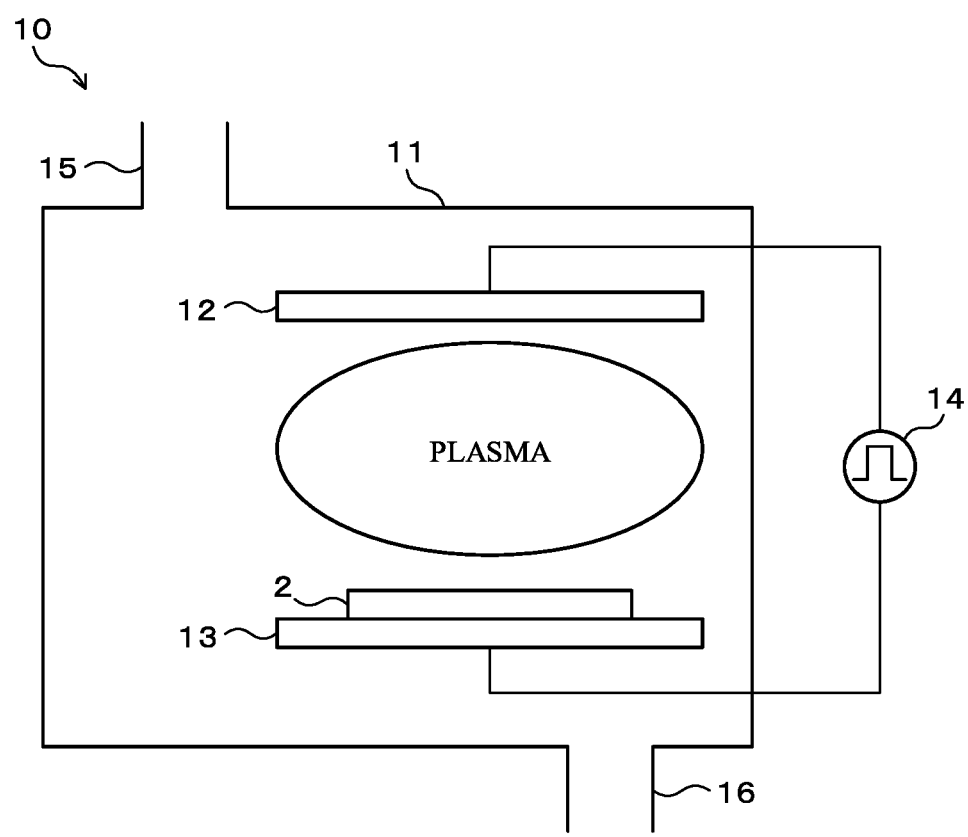
FIG. 2 is a view illustrating a schematic configuration of a film forming apparatus of a vanadium silicon carbide film according to one embodiment of the present invention.

In this embodiment, the vanadium silicon carbide film 3 is formed on the base material 2 by a plasma chemical vapor deposition method in which a film is formed by turning a raw material gas supplied into the film forming apparatus into plasma, and then the vanadium silicon carbide film coated member 1 is manufactured. As the film forming apparatus of the vanadium silicon carbide film 3, for example, a plasma processing apparatus 10 illustrated in FIG. 2 is used. The plasma processing apparatus 10 includes a chamber 11 into which the base material 2 is carried, an anode 12 and a cathode 13, and a DC pulse power supply 14 that applies a pulse voltage between the anode 12 and the cathode 13. A gas supply pipe 15 through which each raw material gas is supplied is connected to an upper part of the chamber 11, and a gas exhaust pipe 16 that exhausts gas in the chamber 11 is connected to a lower part of the chamber 11. On the downstream side of the gas exhaust pipe 16, a vacuum pump (not illustrated) is provided. The cathode 13 also has a role as a support table that supports the base material 2, and the base material 2 carried in the chamber 11 is mounted on the cathode 13. Inside the chamber 11, a heater (not illustrated) is provided, the heater adjusts an atmospheric temperature in the chamber 11, and thereby the temperature of the base material 2 is adjusted.

Incidentally, the configuration of the plasma processing apparatus 10 is not limited to the one explained in this embodiment. For example, a high-frequency power supply may be used in place of the DC pulse power supply 14, or a shower head (not illustrated) that supplies the raw material gas may be provided and used as the anode 12. Besides, the base material 2 may be heated only with a glow current without providing the heater. That is, the plasma processing apparatus 10 only needs to have a structure capable of turning the raw material gas to be supplied into the chamber 11 into plasma and forming the vanadium silicon carbide film 3 on the base material 2 to manufacture the vanadium silicon carbide film coated member 1.

<Film Forming Processing Preparation>

The base material 2 is carried into the chamber 11 and the base material 2 is set at a predetermined position. Thereafter, evacuation is performed so that the pressure in the chamber 11 becomes, for example, 10 Pa or less. At this time, the temperature in the chamber 11 is about room temperature. Subsequently, for example, the heater is operated to perform a baking treatment on the base material 2, and then the power of the heater is turned off, and the plasma processing apparatus 10 is let stand to cool the inside of the chamber 11.

Next, a small amount of hydrogen gas is supplied into the chamber 11, and the heater is operated again. In this heating step, the temperature of the base material 2 is raised up to near a plasma processing temperature. The pressure in the chamber 11 is maintained, for example, at about 100 Pa.

<Vanadium Silicon Carbide Film Forming Step>

Next, as the raw material gas for forming the vanadium silicon carbide film 3, a vanadium chloride gas, a silicon source gas, a carbon source gas, and a hydrogen gas are supplied into the chamber 11, and the pulse power supply 14 is used to apply a pulse voltage between the anode 12 and the cathode 13. As a result, the raw material gases supplied into the chamber 11 are turned into plasma between the anode 12 and the cathode 13, and the vanadium silicon carbide film 3 is formed on the base material 2.

As the vanadium chloride gas, for example, a vanadium tetrachloride ($VCl_4$) gas or a vanadium trichloride oxide ($VOCl_3$) gas is used. Incidentally, it is preferable to use the vanadium tetrachloride gas as the vanadium chloride gas from the viewpoint that the number of elements constituting the gas is small and removing impurities in the vanadium silicon carbide film 3 is facilitated. Further, the vanadium tetrachloride gas is also preferable because it is easily available, is liquid at room temperature, and is easily supplied as a gas.

As the silicon source gas, for example, a silane-based gas such as a monosilane gas, a disilane gas, a dichlorosilane gas, a trichlorosilane gas, a silicon tetrachloride gas, or a silicon tetrafluoride gas is used. The gases cited as an example here may be supplied alone, or a mixture of two or more of the gases may be supplied. Among these gases, the silicon tetrachloride ($SiCl_4$) gas, from which chlorine atoms can be removed easily by hydrogen plasma and which is thermally stable and decomposes only in the plasma, is preferably used. Further, as the silicon source gas, an organosilane gas having a molecular structure in which a hydrocarbon functional group is bonded to silicon, may be used. Having a hydrocarbon functional group, the organosilane gas also functions as a carbon source gas. The organosilane gas is not limited in particular as long as it is those with a molecular structure in which a hydrocarbon functional group is bonded to silicon, but is, for example, a monomethylsilane gas, a dimethylsilane gas, a trimethylsilane gas, a tetramethylsilane gas, or the like.

As the carbon source gas, for example, a hydrocarbon gas such as a methane gas, an ethane gas, an ethylene gas, or an acetylene gas is used. The gases cited as an example here may be supplied alone, or a mixture of two or more of the gases may be supplied. Further, a mixed gas of the aforementioned organosilane gas and the carbon source gas may also be used. When such a mixed gas is used, a film-forming rate is improved compared to the case where the carbon source gas is used alone.

In the case where the vanadium chloride gas is contained in the raw material gas supplied in the vanadium silicon carbide film forming step, in the vanadium silicon carbide film 3, chlorine as an impurity is inevitably contained in the remainder of the film from which vanadium, silicon, and carbon have been removed. Chlorine easily combines with a hydrogen gas, and thus, when the hydrogen gas is contained in the raw material gas, the chlorine generated from the vanadium chloride gas combines with hydrogen to be easily discharged to the outside of the system. As a result, it is possible to inhibit the mixing of chlorine into the vanadium silicon carbide film 3. Incidentally, in addition to chlorine, inevitable impurities can be contained in the remainder of the vanadium silicon carbide film 3.

Further, in the vanadium silicon carbide film forming step, in the case where the vanadium chloride gas and the silicon tetrachloride gas are supplied into the chamber 11, the volume flow rate of the hydrogen gas supplied into the chamber 11 is preferably 5 times to 25 times the total of the volume flow rate of the vanadium chloride gas and the volume flow rate of the silicon tetrachloride gas.

Incidentally, the argon gas may be supplied into the chamber 11 as necessary, because argon ions ionize other molecules, thereby contributing to the stabilization of plasma and the improvement in ion density.

In the vanadium silicon carbide film forming step, the ratio of the flow rates of the vanadium chloride gas, the silicon source gas, the carbon source gas, the hydrogen gas, and the argon gas is preferably 1:0.25 to 2:3 to 20:20 to 35:0.5 to 2. This makes it easier to obtain the vanadium silicon carbide film 3 with the total of the vanadium element concentration, the silicon element concentration, and the carbon element concentration in the film being 90 at % or more. Incidentally, in this description, the "flow rate of the vanadium chloride gas, the "flow rate of the silicon source gas," and the "flow rate of the carbon source gas," which are used in the calculation of the above-described flow rate ratio, are the flow rates obtained by the conversion of the volume flow rates of the respective gases at 0° C. and 1 atm, which are supplied into the chamber 11 as the raw material gas for the film forming, according to the number of vanadium atoms, the number of silicon atoms, and the number of carbon atoms contained in each molecule. For example, the organosilane gas, which can be used as the silicon source gas, also functions as the carbon source gas, and thus, when calculating the ratio of the flow rates of the silicon source gas and the carbon source gas in the case of using the organosilane gas, the volume flow rate of the organosilane gas needs to be counted not only as the flow rate of the silicon source gas but also as the flow rate of the carbon source gas. Therefore, the ratio of the flow rates of the silicon source gas and the carbon source gas in the case of using the organosilane gas is not the value equal to the ratio of the volume flow rate of the organosilane gas and the volume flow rate of the gas (for example, methane gas) supplied into the chamber 11 as the carbon source gas. Incidentally, when calculating the above-described flow rate ratio, the "flow rate of the hydrogen gas" is the volume flow rate of the hydrogen gas at 0° C. and 1 atm and the "flow rate of the argon gas" is the volume flow rate of the argon gas at 0° C. and 1 atm.

A specific calculation method of the flow rate when calculating the flow rate ratio is as follows. For example, in the case where the vanadium tetrachloride gas with a volume flow rate of 3 ml/min at 0° C. and 1 atm is supplied as one of the raw material gases, 3 ml/min is added as the flow rate of the vanadium chloride gas when calculating the flow rate ratio because 1 mol of vanadium is contained in 1 mol of vanadium tetrachloride. Further, in the case where the monomethylsilane gas with a volume flow rate of 4.5 ml/min at 0° C. and 1 atm is supplied as one of the raw material gases, 4.5 ml/min is added as the flow rate of the silicon source gas and 4.5 ml/min is added as the flow rate of the carbon source gas when calculating the flow rate ratio because 1 mol of silicon and 1 mol of carbon are contained in 1 mol of monomethylsilane. Further, in the case where the methane gas with a volume flow rate of 10 ml/min at 0° C. and 1 atm is supplied as one of the raw material gases, 10 ml/min is added as the flow rate of the carbon source gas when calculating the flow rate ratio because 1 mol of carbon is contained in 1 mol of methane. Therefore, in the case where 3 ml/min of the vanadium tetrachloride gas, 4.5 ml/min of the monomethylsilane gas, and 10 ml/min of the methane gas are supplied as the raw material gas, when calculating the flow rate ratio, the flow rate of the vanadium chloride gas is 3 ml/min, the flow rate of the silicon source gas is 4.5 ml/min, and the flow rate of the carbon source gas is 14.5 ml/min. Further, as another example, there is considered the case where 3 ml/min of the vanadium tetrachloride gas, 4.5 ml/min of the dimethylsilane gas, and 10 ml/min of the methane gas are supplied. In this case, 1 mol of silicon and 2 mol of carbon are contained in 1 mol of dimethylsilane, and thus, when calculating the flow rate ratio, the flow rate of the vanadium chloride gas is 3 ml/min, the flow rate of the silicon source gas is 4.5 ml/min, and the flow rate of the carbon source gas is 19.5 ml/min.

Incidentally, in the case where the monomethylsilane gas and the methane gas are used as the raw material gas supplied into the chamber 11, the ratio of the volume flow rates of the monomethylsilane gas and the methane gas (monomethylsilane gas volume flow rate/methane gas volume flow rate) is preferably 0.05 to 1.0.

The pressure in the chamber 11 in the vanadium silicon carbide film forming step is preferably set to, for example, 30 to 200 Pa. The pressure in the chamber 11 is preferably 50 Pa or more, and preferably 150 Pa or less. Further, the power to be applied in the vanadium silicon carbide film forming step is preferably 150 to 2500 W. Further, in the case of using the DC pulse power supply 14, the power to be applied in the vanadium silicon carbide film forming step is preferably 150 W, and preferably 1000 W or less. It is more preferably 600 W or less. The power [W] is a value calculated by a voltage [V]×a current [A]. The voltage is a set voltage of the pulse power supply 14. The current is a value calculated by (maximum current+minimum current)/2 in the vanadium silicon carbide film forming step using current values displayed on the pulse power supply 14. The power can be adjusted by changing a set value of the Duty ratio. The Duty ratio is defined by a voltage application time per pulse cycle and is calculated by Duty ratio (%)=100× voltage application time (ON time)/{voltage application time (ON time)+voltage application stop time (OFF time)}. Incidentally, in the case of using the DC pulse power supply 14, the voltage in the vanadium silicon carbide film forming step is preferably 1000 to 2000 V. Further, in the case of using the DC pulse power supply 14, the Duty ratio in the vanadium silicon carbide film forming step is preferably 5% to 60%. Setting the Duty ratio to 5% to 60% facilitates the obtaining of the vanadium silicon carbide film 3 with the total of the vanadium element concentration, the silicon element concentration, and the carbon element concentration being 90 at % or more.

By the above vanadium silicon carbide film forming step, the vanadium silicon carbide film 3 with the total of the vanadium element concentration, the silicon element concentration, and the carbon element concentration being 90 at % or more is formed on the base material 2, thereby making it possible to manufacture the vanadium silicon carbide film coated member 1 having a low friction coefficient.

While one embodiment of the present invention has been described, the present invention is not limited to the example. It should be understood that various change examples and modification examples are readily apparent to those skilled in the art within the technical spirit as set forth in claims, and those should also be covered by the technical scope of the present invention.

EXAMPLES

Using the plasma chemical vapor deposition method, a test piece of the vanadium silicon carbide film coated member with the vanadium silicon carbide film formed on the base material was fabricated and its characteristics were evaluated.

Figure 3:
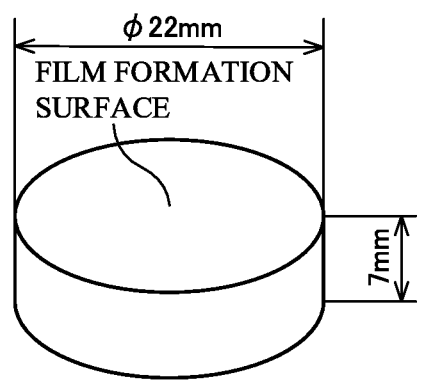
FIG. 3 is a view illustrating a shape of a test piece.

As the base material on which the vanadium silicon carbide film is formed, a base material was used that was obtained by cutting a round bar of ϕ 22 mm made of DC53 being one type of the die steel at an interval of 6 to 7 mm, and performing mirror polishing on a film forming surface of the round bar cut as illustrated in FIG. 3. Incidentally, the vanadium silicon carbide film is formed on a surface on the side subjected to the mirror polishing of the base material. As the film forming apparatus, an apparatus having the structure illustrated in FIG. 2 is used, and the power supply is the pulse power supply.

Example 1

Here, there is explained a manufacturing method of a test piece in Example 1. Incidentally, the volume flow rates of a hydrogen gas, an argon gas, a vanadium tetrachloride gas, a silicon tetrachloride gas, and a methane gas in the following explanation each are the volume flow rate at 0° C. and 1 atm.

First, the base material is set in the chamber of the film forming apparatus, and the inside of the chamber is evacuated for 30 minutes to reduce the pressure in the chamber to 10 Pa or less. At this time, the heater provided in the chamber is not operated. Incidentally, the atmospheric temperature in the chamber is measured by a sheathed thermocouple. Subsequently, the set temperature of the heater is set to 200° C., and the baking treatment of the base material is performed for 10 minutes. After that, the power of the heater is turned off, and the film forming apparatus is let stand for 30 minutes to cool the inside of the chamber.

Next, the hydrogen gas is supplied into the chamber at a volume flow rate of 100 ml/min, and the pressure in the chamber is set to 100 Pa by adjusting the exhaust rate. Then, the set temperature of the heater is set to 525° C., and the atmosphere in the chamber is heated for 30 minutes.

Next, the voltage is set to 800V, the Duty ratio is set to 40%, and the DC pulse power supply is operated in a unipolar output form. Thereby, the hydrogen gas is turned into plasma between the electrodes in the chamber. After that, the volume flow rate of the hydrogen gas is set to 98 ml/min, and the argon gas at a volume flow rate of 3 ml/min is supplied into the chamber. Further, the pressure in the chamber is set to 58 Pa by adjusting the exhaust rate. Then, the voltage of the pulse power supply is raised to 1400V. This makes a state where the hydrogen gas and the argon gas are turned into plasma between the electrodes.

<Vanadium Silicon Carbide Film Forming Step>

Then, the volume flow rate of the vanadium tetrachloride gas as an example of the vanadium chloride gas is set to 3 ml/min, the volume flow rate of the silicon tetrachloride gas as an example of the silicon source gas is set to 4.5 ml/min, the volume flow rate of the methane gas as an example of the carbon source gas is set to 15 ml/min, the volume flow rate of the hydrogen gas is set to 98 ml/min, and the volume flow rate of the argon gas is set to 3 ml/min, and the respective gases are supplied into the chamber. In other words, the respective gases are supplied so that the flow rate ratio of the vanadium chloride gas, the silicon source gas, the carbon source gas, the hydrogen gas, and the argon gas becomes 1:1.5:5:33:1. At this time, the exhaust rate is adjusted to set the pressure in the chamber to 58 Pa. Then, the voltage of the pulse power supply is set to 1400 V and the Duty ratio is set to 40%. The power of the pulse power supply at this time was 378 W. Thereby, vanadium, silicon, and carbon turned into plasma are adsorbed to the base material, whereby the vanadium silicon carbide film containing vanadium, silicon, and carbon is formed on the base material. This state was maintained for 6 hours to obtain the test piece of the vanadium silicon carbide film coated member in Example 1 with the vanadium silicon carbide film formed on the base material.

In Example 2, the vanadium silicon carbide film is formed under the same condition as in Example 1 except that the Duty ratio in the vanadium silicon carbide film forming step was changed to 20% and the power of the pulse power supply at this time was 266 W.

In Example 3, the vanadium silicon carbide film is formed under the same condition as in Example 1 except that the Duty ratio in the vanadium silicon carbide film forming step was changed to 10% and the power of the pulse power supply at this time was 224 W.

In Example 4, the vanadium silicon carbide film is formed under the same condition as in Example 1 except that in the vanadium silicon carbide film forming step, the volume flow rate of the methane gas was changed to 30 ml/min, the volume flow rate of the hydrogen gas was changed to 83 ml/min, the Duty ratio was changed to 10%, and the power of the pulse power supply at this time was 266 W. Incidentally, in the vanadium silicon carbide film forming step in Example 4, the respective gases are supplied into the chamber in a state where the flow rate ratio of the vanadium chloride gas, the silicon source gas, the carbon source gas, the hydrogen gas, and the argon gas becomes 1:1.5:10:28:1.

In Example 5, the vanadium silicon carbide film is formed under the same condition as in Example 1 except that in the vanadium silicon carbide film forming step, the volume flow rate of the methane gas was changed to 45 ml/min, the volume flow rate of the hydrogen gas was changed to 68 ml/min, the Duty ratio was changed to 10%, and the power of the pulse power supply at this time was 308 W. Incidentally, in the vanadium silicon carbide film forming step in Example 5, the respective gases are supplied into the chamber in a state where the flow rate ratio of the vanadium chloride gas, the silicon source gas, the carbon source gas, the hydrogen gas, and the argon gas becomes 1:1.5:15:23:1.

In Example 6, the vanadium silicon carbide film is formed under the same condition as in Example 1 except that in the vanadium silicon carbide film forming step, the volume flow rate of the silicon tetrachloride gas was changed to 3 ml/min, the Duty ratio was changed to 10%, and the power of the pulse power supply at this time was 210 W. Incidentally, in the vanadium silicon carbide film forming step in Example 6, the respective gases are supplied into the chamber in a state where the flow rate ratio of the vanadium chloride gas, the silicon source gas, the carbon source gas, the hydrogen gas, and the argon gas becomes 1:1:5:33:1.

In Example 7, the vanadium silicon carbide film is formed under the same condition as in Example 1 except that in the vanadium silicon carbide film forming step, the volume flow rate of the silicon tetrachloride gas was changed to 1.5 ml/min, the Duty ratio was changed to 10%, and the power of the pulse power supply at this time was 224 W. Incidentally, in the vanadium silicon carbide film forming step in Example 7, the respective gases are supplied into the chamber in a state where the flow rate ratio of the vanadium chloride gas, the silicon source gas, the carbon source gas, the hydrogen gas, and the argon gas becomes 1:0.5:5:33:1.

In Example 8, the vanadium silicon carbide film is formed under the same condition as in Example 1 except that in the vanadium silicon carbide film forming step, the volume flow rate of the silicon tetrachloride gas was changed to 4.5 ml/min, the volume flow rate of the methane gas was changed to 25 ml/min, the volume flow rate of the hydrogen gas was changed to 88 ml/min, and the power of the pulse power supply at this time was 476 W. Incidentally, in the vanadium silicon carbide film forming step in Example 8, the respective gases are supplied into the chamber in a state where the flow rate ratio of the vanadium chloride gas, the silicon source gas, the carbon source gas, the hydrogen gas, and the argon gas becomes 1:1.5:8:29:1.

In Example 9, the vanadium silicon carbide film is formed under the same condition as in Example 1 except that in the vanadium silicon carbide film forming step, as the silicon source gas, the monomethylsilane gas was used, the volume flow rate of the methane gas was changed to 10 ml/min, the treatment time was changed to 3 hours, and the power of the pulse power supply at this time was 364 W. Incidentally, in the vanadium silicon carbide film forming step in Example 9, the respective gases are supplied into the chamber in a state where the flow rate ratio of the vanadium chloride gas, the silicon source gas, the carbon source gas, the hydrogen gas, and the argon gas becomes 1:1.5:4.8:33:1.

In Example 10, the vanadium silicon carbide film is formed under the same condition as in Example 1 except that in the vanadium silicon carbide film forming step, as the silicon source gas, the monomethylsilane gas was used, the volume flow rate of the methane gas was changed to 30 ml/min, the volume flow rate of the hydrogen gas was changed to 78 ml/min, the Duty ratio was changed to 20%, the treatment time was changed to 3 hours, and the power of the pulse power supply at this time was 241 W. Incidentally, in the vanadium silicon carbide film forming step in Example 10, the respective gases are supplied into the chamber in a state where the flow rate ratio of the vanadium chloride gas, the silicon source gas, the carbon source gas, the hydrogen gas, and the argon gas becomes 1:1.5:11.5:26:1.

In Comparative example 1, in place of the vanadium silicon carbide film, a vanadium silicocarbonitride film was formed on the base material to obtain a test piece of a vanadium silicocarbonitride film coated member. In a vanadium silicocarbonitride film forming step, the volume flow rate of the vanadium tetrachloride gas was set to 5 ml/min, the volume flow rate of the monomethylsilane ($SiH_3CH_3$) gas was set to 5 ml/min, the volume flow rate of the nitrogen gas was set to 50 ml/min, the volume flow rate of the hydrogen gas was set to 200 ml/min, the volume flow rate of the argon gas was set to 5 ml/min, the voltage of the pulse power supply was set to 1500 V, the Duty ratio was set to 30%, and the power of the pulse power supply at this time was 285 W. The vanadium silicocarbonitride film was formed on the base material by the plasma chemical vapor deposition method under such conditions.

Table 1 below illustrates the summary of the film forming conditions of the vanadium silicon carbide film forming step in Examples 1 to 10. Further, Table 2 below illustrates the summary of the film forming conditions of the vanadium silicocarbonitride film forming step in Comparative Example 1.

TABLE 1

| | | EXAMPLE 1 | EXAMPLE 2 | EXAMPLE 3 | EXAMPLE 4 | EXAMPLE 5 |
|---|---|---|---|---|---|---|
| PRESSURE (Pa) | | 58 | 58 | 58 | 58 | 58 |
| SUPPLY GAS | VOLUME FLOW RATE OF VANADIUM TETRACHLORIDE GAS (ml/min) | 3 | 3 | 3 | 3 | 3 |
| | VOLUME FLOW RATE OF SILICON TETRACHLORIDE GAS (ml/min) | 4.5 | 4.5 | 4.5 | 4.5 | 4.5 |
| | VOLUME FLOW RATE OF MONOMETHYLSILANE GAS (ml/min) | 0 | 0 | 0 | 0 | 0 |
| | VOLUME FLOW RATE OF METHANE GAS (ml/min) | 15 | 15 | 15 | 30 | 45 |
| | VOLUME FLOW RATE OF HYDROGEN GAS (ml/min) | 98 | 98 | 98 | 83 | 68 |
| | VOLUME FLOW RATE OF ARGON GAS (ml/min) | 3 | 3 | 3 | 3 | 3 |
| FLOW RATE RATIO CALCULATION | FLOW RATE OF VANADIUM CHLORIDE GAS (ml/min) | 3 | 3 | 3 | 3 | 3 |
| | FLOW RATE OF SILICON SOURCE GAS (ml/min) | 4.5 | 4.5 | 4.5 | 4.5 | 4.5 |
| | FLOW RATE OF CARBON SOURCE GAS (ml/min) | 15 | 15 | 15 | 30 | 45 |
| | FLOW RATE OF HYDROGEN GAS (ml/min) | 98 | 98 | 98 | 83 | 68 |
| | FLOW RATE OF ARGON GAS (ml/min) | 3 | 3 | 3 | 3 | 3 |
| | FLOW RATE RATIO | 1:1.5:5:33:1 | 1:1.5:5:33:1 | 1:1.5:5:33:1 | 1:1.5:10:28:1 | 1:1.5:15:23:1 |
| POWER OF PULSE POWER SUPPLY (W) | | 378 | 266 | 224 | 266 | 308 |
| VOLTAGE OF PULSE POWER SUPPLY (V) | | 1400 | 1400 | 1400 | 1400 | 1400 |
| Duty RATIO (%) | | 40% | 20% | 10% | 10% | 10% |
| TREATMENT TIME (hr) | | 6 | 6 | 6 | 6 | 6 |

| | | EXAMPLE 6 | EXAMPLE 7 | EXAMPLE 8 | EXAMPLE 9 | EXAMPLE 10 |
|---|---|---|---|---|---|---|
| PRESSURE (Pa) | | 58 | 58 | 58 | 58 | 58 |
| SUPPLY GAS | VOLUME FLOW RATE OF | 3 | 3 | 3 | 3 | 3 |

TABLE 1-continued

|  |  |  |  |  |  |  |
|---|---|---|---|---|---|---|
|  | VANADIUM TETRACHLORIDE GAS (ml/min) VOLUME FLOW RATE OF SILICON TETRACHLORIDE GAS (ml/min) | 3 | 1.5 | 4.5 | 0 | 0 |
|  | VOLUME FLOW RATE OF MONOMETHYLSILANE GAS (ml/min) | 0 | 0 | 0 | 4.5 | 4.5 |
|  | VOLUME FLOW RATE OF METHANE GAS (ml/min) | 15 | 15 | 25 | 10 | 30 |
|  | VOLUME FLOW RATE OF HYDROGEN GAS (ml/min) | 98 | 98 | 88 | 98 | 78 |
|  | VOLUME FLOW RATE OF ARGON GAS (ml/min) | 3 | 3 | 3 | 3 | 3 |
| FLOW RATE RATIO CALCULATION | FLOW RATE OF VANADIUM CHLORIDE GAS (ml/min) | 3 | 3 | 3 | 3 | 3 |
|  | FLOW RATE OF SILICON SOURCE GAS (ml/min) | 3 | 1.5 | 4.5 | 4.5 | 4.5 |
|  | FLOW RATE OF CARBON SOURCE GAS (ml/min) | 15 | 15 | 25 | 14.5 | 34.5 |
|  | FLOW RATE OF HYDROGEN GAS (ml/min) | 98 | 98 | 88 | 98 | 78 |
|  | FLOW RATE OF ARGON GAS (ml/min) | 3 | 3 | 3 | 3 | 3 |
|  | FLOW RATE RATIO | 1:1:5:33:1 | 1:0.5:5:33:1 | 1:1.5:8:29:1 | 1:1.5:4.8:33:1 | 1:1.5:11.5:26:1 |
| POWER OF PULSE POWER SUPPLY (W) |  | 210 | 224 | 476 | 364 | 241 |
| VOLTAGE OF PULSE POWER SUPPLY (V) |  | 1400 | 1400 | 1400 | 1400 | 1400 |
| Duty RATIO (%) |  | 10% | 10% | 40% | 40% | 20% |
| TREATMENT TIME (hr) |  | 6 | 6 | 6 | 3 | 3 |

TABLE 2

|  | COMPARATIVE EXAMPLE 1 |
|---|---|
| PRESSURE (Pa) | 58 |
| VOLUME FLOW RATE OF VANADIUM TETRACHLORIDE GAS (ml/min) | 5 |
| VOLUME FLOW RATE OF MONOMETHYLSILANE GAS (ml/min) | 5 |
| VOLUME FLOW RATE OF NITROGEN GAS (ml/min) | 50 |
| VOLUME FLOW RATE OF HYDROGEN GAS (ml/min) | 200 |
| VOLUME FLOW RATE OF ARGON GAS (ml/min) | 5 |
| POWER OF PULSE POWER SUPPLY (W) | 285 |
| VOLTAGE OF PULSE POWER SUPPLY (V) | 1500 |
| Duty RATIO (%) | 30 |
| TREATMENT TIME (hr) | 2 |

On the test pieces in Examples 1 to 10 and Comparative Example 1, a film thickness measurement, a composition analysis, and a friction coefficient measurement by a ball on disk test of the vanadium silicon carbide film and the vanadium silicocarbonitride film were performed. In addition, on Example 1, an X-ray diffraction analysis was performed.

(Film Thickness Measurement)

The film thickness of the vanadium silicon carbide film or the vanadium silicocarbonitride film formed on the base material was measured in a manner that the test piece was vertically cut, the cut surface was subjected to mirror polishing, and then the cut surface was observed under a metallurgical microscope set at 1000-fold magnification, and a calculation was made based on the observed image information.

(Composition Analysis)

The analysis conditions are as follows.

Measuring device: EPMA (DCA-8530F manufactured by JEOL Ltd.)
Measurement mode: semiquantitative analysis
Acceleration voltage: 15 kV
Irradiation current: $1.0 \times 10^{-7}$ A
Beam shape: spot Beam diameter set value: 0
Dispersive crystal: LDE6H, TAP, LDE5H, PETH, LIFH, LDE1H Incidentally, in the case of the film thickness of 1 μm or less, the EPMA measurement result includes the effect of the chemical composition of the base material. Therefore, when calculating the composition analysis of the thin vanadium silicon carbide film or vanadium silicocarbonitride film, it is necessary to perform an EPMA measurement only on the base material beforehand, and then subtract the vanadium element concentration, the silicon element concentration, the carbon element concentration, the nitrogen element concentration, and the chlorine element concentration derived from the base material from the EPMA measurement result after the vanadium silicon carbide film or vanadium silicocarbonitride film is formed.

(Friction Coefficient)

Figure 4:
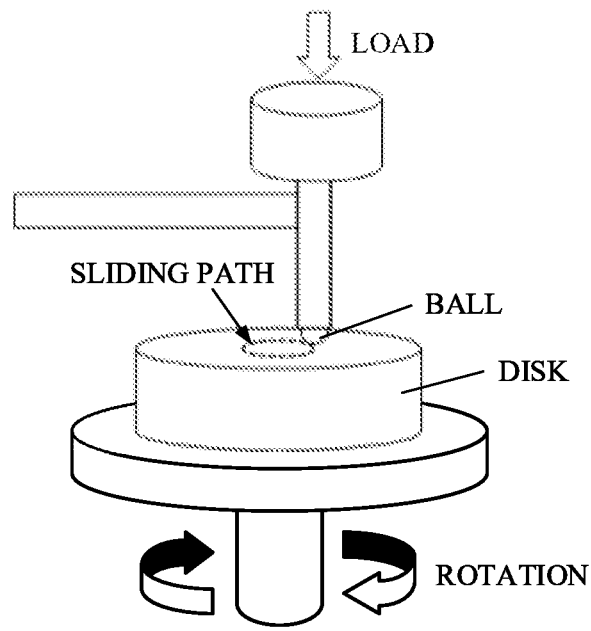
FIG. 4 is a schematic view of a ball on disk test.

As a ball on disk test machine, a "Tribometer" manufactured by CSM Instruments was used. A disk is the test pieces in Examples 1 to 10 or the test piece in Comparative example 1. A ball with a diameter of 6 mm, which was made of S45C of carbon steel, was used as the ball to come into contact with the disk. In a condition with the temperature of 23 to 24° C. and the humidity of 21%, as illustrated in FIG. 4, the ball was brought into contact with the disk and the disk was rotated so that a sliding speed became 0.167 m/s while applying a load of 5 N to the ball. The contact point between the ball and the disk is a point with a radius of 6 mm from the center of the disk. Then, the friction coefficient between the disk and the ball when the sliding distance of the disk and the ball reached 40 m was used as a measured value of the friction coefficient of the vanadium silicon carbide film or the vanadium silicocarbonitride film formed on the base material.

(Film Hardness Measurement)

The hardness measurement is performed by the nano-indentation method using a FISCHER SCOPE (registered trademark) HM100C manufactured by Fischer Instruments. Specifically, a Berkovich-type diamond indenter is pushed into the test piece with a maximum indentation load set to 3 mN, and an indentation depth is continuously measured. Based on the obtained measurement data of the indentation depth, a Martens hardness and a Vickers hardness converted from the Martens hardness are calculated by using "brand name: WIN-HCU (registered trademark)" being software manufactured by Fischer Instruments. The calculated Vickers hardness is displayed on a screen of the measuring device, and the numerical value is used as the hardness of the film at a measurement point. In this example, the Vickers hardnesses at arbitrary 20 points on the uppermost surface of each test piece are obtained, and the average value of the obtained hardnesses is set as the Vickers hardness of the film.

The measurement results of the film thickness, the film-forming rate, the composition, the friction coefficient, and the hardness of the vanadium silicon carbide film are illustrated in Table 3 below. The measurement results of the film thickness, the composition, the friction coefficient, and the hardness of the vanadium silicocarbonitride film are illustrated in Table 4 below.

TABLE 3

| | EXAMPLE 1 | EXAMPLE 2 | EXAMPLE 3 | EXAMPLE 4 | EXAMPLE 5 |
|---|---|---|---|---|---|
| TYPE OF FILM | VANADIUM SILICON CARBIDE FILM | | | | |
| FILM THICKNESS (μm) | 2.1 | 1.9 | 1.6 | 1.7 | 1.9 |
| FILM-FORMING RATE FILM THICKNESS (μm)/TREATMENT TIME (hr) | 0.35 | 0.32 | 0.27 | 0.28 | 0.32 |
| VANADIUM ELEMENT CONCENTRATION (at %) | 19.0 | 20.4 | 22.3 | 18.3 | 10.6 |
| SILICON ELEMENT CONCENTRATION (at %) | 17.9 | 21.0 | 20.1 | 16.9 | 12.6 |
| CARBON ELEMENT CONCENTRATION (at %) | 60.7 | 56.2 | 55.1 | 61.8 | 73.3 |
| CHLORINE ELEMENT CONCENTRATION (at %) | 2.5 | 2.4 | 2.5 | 3.0 | 3.5 |
| VANADIUM ELEMENT CONCENTRATION + SILICON ELEMENT CONCENTRATION + CARBON ELEMENT CONCENTRATION (at %) | 97.5 | 97.6 | 97.5 | 97.0 | 96.5 |
| CARBON ELEMENT CONCENTRATION − VANADIUM ELEMENT CONCENTRATION − SILICON ELEMENT CONCENTRATION (at %) | 23.8 | 14.8 | 12.7 | 26.6 | 50.0 |
| FRICTION COEFFICIENT | 0.17 | 0.24 | 0.46 | 0.09 | 0.04 |
| HARDNESS (HV) | 3102 | 3406 | 3373 | 2801 | 3110 |

| | EXAMPLE 6 | EXAMPLE 7 | EXAMPLE 8 | EXAMPLE 9 | EXAMPLE 10 |
|---|---|---|---|---|---|
| TYPE OF FILM | VANADIUM SILICON CARBIDE FILM | | | | |
| FILM THICKNESS (μm) | 1.8 | 1.8 | 1.9 | 1.5 | 1.5 |
| FILM-FORMING RATE FILM THICKNESS (μm)/TREATMENT TIME (hr) | 0.30 | 0.30 | 0.32 | 0.50 | 0.50 |

TABLE 3-continued

| | | | | | |
|---|---|---|---|---|---|
| VANADIUM ELEMENT CONCENTRATION (at %) | 23.3 | 21.3 | 11.6 | 9.1 | 10.0 |
| SILICON ELEMENT CONCENTRATION (at %) | 15.3 | 10.6 | 13.9 | 26.8 | 25.3 |
| CARBON ELEMENT CONCENTRATION (at %) | 59.2 | 66.3 | 71.2 | 60.5 | 62.5 |
| CHLORINE ELEMENT CONCENTRATION (at %) | 2.1 | 1.8 | 3.3 | 3.6 | 2.2 |
| VANADIUM ELEMENT CONCENTRATION + SILICON ELEMENT CONCENTRATION + CARBON ELEMENT CONCENTRATION (at %) | 97.9 | 98.2 | 96.7 | 96.4 | 97.8 |
| CARBON ELEMENT CONCENTRATION − VANADIUM ELEMENT CONCENTRATION − SILICON ELEMENT CONCENTRATION (at %) | 20.5 | 34.3 | 45.7 | 24.6 | 27.2 |
| FRICTION COEFFICIENT | 0.17 | 0.19 | 0.12 | 0.20 | 0.19 |
| HARDNESS (HV) | 3693 | 3280 | 2953 | 2875 | 3083 |

TABLE 4

| | COMPARATIVE EXAMPLE 1 |
|---|---|
| TYPE OF FILM | VANADIUM SILICOCARBONITRIDE FILM |
| FILM THICKNESS (μm) | 2.6 |
| VANADIUM ELEMENT CONCENTRATION (at %) | 22.3 |
| SILICON ELEMENT CONCENTRATION (at %) | 27.2 |
| CARBON ELEMENT CONCENTRATION (at %) | 21.2 |
| CHLORINE ELEMENT CONCENTRATION (at %) | 3.0 |
| NITROGEN ELEMENT CONCENTRATION (at %) | 25.8 |
| VANADIUM ELEMENT CONCENTRATION + SILICON ELEMENT CONCENTRATION + CARBON ELEMENT CONCENTRATION (at %) | 70.7 |
| BALANCE (at %) | 0.5 |
| FRICTION COEFFICIENT | 0.8 |
| HARDNESS | 3366 |

As illustrated in Table 3 and Table 4, the friction coefficient of the vanadium silicon carbide film in each of Examples 1 to 10 is significantly lower than that of the vanadium silicocarbonitride film in Comparative example 1. The results of this example reveal that the vanadium silicon carbide film with the total of the vanadium element concentration [at %], the silicon element concentration [at %], and the carbon element concentration [at %] in the film being 90 at % or more is a film having a low friction coefficient.

Further, as illustrated in Table 3, the film-forming rate in each of Examples 9 to 10 is 1.4 times or more that of each of Examples 1 to 8, indicating that the film-forming rate is significantly improved. The silicon source gas used in Examples 1 to 8 and the silicon source gas used in Examples 9 to 10 are different from each other, and in Examples 1 to 8, the silicon tetrachloride gas is used as the silicon source gas, while in Examples 9 to 10, the monomethylsilane gas is used as the silicon source gas. In other words, in Examples 9 to 10, a mixed gas of the monomethylsilane gas and the methane gas is supplied into the chamber, and it can be said that the supply of such a mixed gas contributes to the film-forming rate. The results of this example reveal that the film-forming rate can be improved by using the mixed gas of the monomethylsilane gas and the carbon source gas in the forming step of the vanadium silicon carbide film.

(X-Ray Diffraction Analysis)

Figure 5:
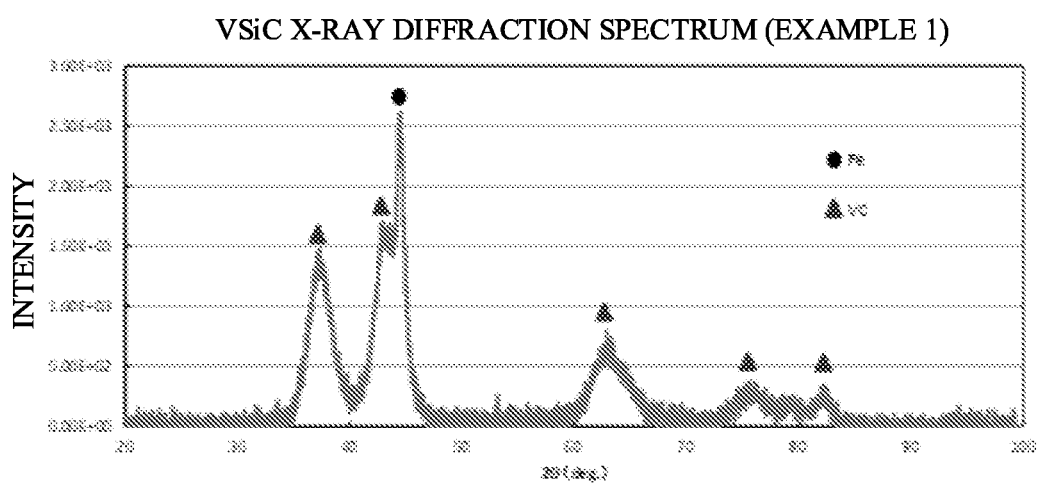
FIG. 5 is a view illustrating an X-ray diffraction spectrum of a vanadium silicon carbide film (VSiC).

Using an XRD analyzing apparatus (SmartLab manufactured by Rigaku), an X-ray diffraction analysis of the surface of the test piece at the time when the film formation of the vanadium silicon carbide film in Example 1 was finished was performed. In order to obtain only the information near the surface of the test piece, the analysis was performed by a tilt angle incident method, the incident angle was set to 1.0°, and a CuKα ray was used as an X-ray source. The XRD analysis result of Example 1 is illustrated in FIG. 5. As illustrated in FIG. 5, the peaks of vanadium carbide (VC) were observed in the vanadium silicon carbide film.

INDUSTRIAL APPLICABILITY

The vanadium silicon carbide film having a low friction coefficient and the vanadium silicon carbide film coated member with the vanadium silicon carbide film formed on the base material according to the present invention can be used for a metal mold, a cutting tool, a gear cutting tool, a forging tool, an automotive part, and so on.

EXPLANATION OF CODES 1 vanadium silicon carbide film coated member
2 base material
3 vanadium silicon carbide film
10 plasma processing apparatus
11 chamber
12 anode
13 cathode
14 pulse power supply
15 gas supply pipe
16 gas exhaust pipe

The invention claimed is:
1. A vanadium silicon carbide film, comprising vanadium, silicon, and carbon, wherein
the total of a vanadium element concentration, a silicon element concentration, and a carbon element concentration in the film is 93 at % or more, in the film, the vanadium element concentration is 8 to 30 at %, the silicon element concentration is 8 to 30 at %, and the carbon element concentration is 40 to 80 at %, the vanadium silicon carbide film does not comprise nitrogen, and the vanadium element concentration, the silicon element concentration, and the carbon element concentration in the film satisfy (1) Expression below:

(carbon element concentration−vanadium element concentration−silicon element concentration)
≧10.0 at %     (1).

2. The vanadium silicon carbide film according to claim 1, wherein
the hardness of the film is 2700 HV or more.

3. The vanadium silicon carbide film according to claim 1, wherein
the total of the vanadium element concentration, the silicon element concentration, and the carbon element concentration in the film is to 96.4 at % or more.

4. A vanadium silicon carbide film coated member, comprising:
a base material; and
the vanadium silicon carbide film according to claim 1 formed on the base material.

5. A manufacturing method of the vanadium silicon carbide film coated member according to claim 4, the method comprising:

supplying a vanadium chloride gas, a silicon source gas, a carbon source gas, and a hydrogen gas into a chamber and forming a vanadium silicon carbide film on a base material by using a plasma chemical vapor deposition method to manufacture the vanadium silicon carbide film coated member.

6. The manufacturing method of the vanadium silicon carbide film coated member according to claim 5, wherein
in the vanadium silicon carbide film forming step, a pulse power supply is used to apply a pulse voltage with a Duty ratio, which is a voltage application time per pulse cycle, set to 5 to 60%.

7. The manufacturing method of the vanadium silicon carbide film coated member according to claim 5, wherein
in the vanadium silicon carbide film forming step, the vanadium chloride gas, the silicon source gas, the carbon source gas, the hydrogen gas, and an argon gas are supplied into the chamber, and
a flow rate ratio of the vanadium chloride gas, the silicon source gas, the carbon source gas, the hydrogen gas, and the argon gas is 1:0.25 to 2:3 to 20:20 to 35:0.5 to 2.

8. The manufacturing method of the vanadium silicon carbide film coated member according to claim 5, wherein
the silicon source gas is an organosilane gas.

9. The manufacturing method of the vanadium silicon carbide film coated member according to claim 8, wherein
the organosilane gas is a monomethylsilane gas.

* * * * *